United States Patent [19]

Birnbrich et al.

[11] Patent Number: 5,610,242
[45] Date of Patent: Mar. 11, 1997

[54] PROCESS FOR MODIFYING POLYMERS

[75] Inventors: Paul Birnbrich, Solingen; Ulrich Eicken, Korschenbroich; Herbert Fischer, Duesseldorf; Joerg-Dieter Klamann, Bremerhaven; Ludwig Schieferstein, Ratingen, all of Germany

[73] Assignee: Henkel Kommanditgesellschaft auf Aktien, Duesseldorf, Germany

[21] Appl. No.: 379,627

[22] PCT Filed: Jul. 26, 1993

[86] PCT No.: PCT/EP93/01986

§ 371 Date: Feb. 3, 1995

§ 102(e) Date: Feb. 3, 1995

[87] PCT Pub. No.: WO94/03523

PCT Pub. Date: Feb. 17, 1994

[30] Foreign Application Priority Data

Aug. 3, 1992 [DE] Germany .......................... 42 25 627.5

[51] Int. Cl.$^6$ .......................... C08F 283/02; C08G 63/91; C08L 67/08

[52] U.S. Cl. .......................... 525/444.5; 525/437; 525/440; 525/444.5; 525/452; 525/454; 525/540; 521/48

[58] Field of Search .......................... 525/25, 437, 444.5, 525/440, 452, 454, 540; 521/48

[56] References Cited

U.S. PATENT DOCUMENTS 4,351,936  9/1982  Matsumura et al. .................... 528/289

FOREIGN PATENT DOCUMENTS 58-136622A  8/1983  Japan .

*Primary Examiner*—Samuel A. Acquah
*Attorney, Agent, or Firm*—Ernest G. Szoke; Wayne C. Jaeschke; Daniel S. Ortiz

[57] ABSTRACT

A process for modifying polymers containing carboxyl, hydroxyl and/or phenolic hydroxyl groups. In the process, the polymers are reacted with a delta$^2$ mono- or bis-oxazoline, each substituted in the 2-position by an optionally substituted alkyl or alkenyl group containing from 7 to 23 carbon atoms. The modified polymers show reduced melt viscosities, lower adhesion and better slip characteristics than unmodified polymers.

20 Claims, No Drawings

PROCESS FOR MODIFYING POLYMERS

FIELD OF THE INVENTION

This invention relates to a process for modifying polymers containing functional groups by reaction with delta$^2$-oxazolines.

RELATED ART

It is known from the literature that delta$^2$-oxazolines are capable of reacting with various chemical compounds in a ring-opening reaction. Thus, ester amides of aminoethanol are formed, for example, from delta$^2$-oxazolines substituted in the 2-position by reaction with carboxylic acids. Phenyl ethers derived from ethanol-amides are formed by reaction with phenols while amino-amides or, optionally, amides are formed by reaction with amines. Further information on this subject can be found in synoptic articles, cf. for example J. A. Frump, Chem. Rev. 71, 483–505 (1971), more particularly pages 494–498, and H. Hellmann et al., Angew. Chem. 78, 913–27 (1966).

The reaction of oxazolines with compounds containing carboxyl, amino and/or phenolic hydroxyl groups has already been used to modify polymers. Thus, U.S. Pat. No. 4,351,936 describes the reaction of carboxyl-terminated polyesters with oxazolines substituted in the 2-position by amino groups, aminocarbonyl groups or ether groups. The number of free carboxyl groups in the polyester molecules is reduced by the reaction. GB 1,426,409 describes the reaction of phenylene bis-oxazolines with carboxyl-terminated polyesters which, besides reducing the number of free carboxyl groups, also leads to an increase in molecular weight. Disadvantages of these processes include the poor reactivity of the phenylene bis-oxazolines and the monofunctionality of the alkylamino, alkylcarbamoyl and alkoxyoxazolines which prevents the desired reduction in the molecular weight of the polyester during processing.

BRIEF SUMMARY OF THE INVENTION

It has now been found that certain, preferably long-chain substituted delta$^2$-oxazolines and/or bis-delta$^2$-oxazolines are far more suitable for modifying polymers containing reactive functional groups.

The present invention relates to a process for modifying polymers containing carboxyl, amino and/or phenolic hydroxyl groups by reaction with delta$^2$-oxazolines, characterized in that 2-phenyloxazoline or mono- or bis-oxazolines substituted in the 2-position by a long-chain, optionally substituted alkyl or alkenyl radical containing 7 to 23 carbon atoms in a linear chain are used as the delta$^2$-oxazolines. The process according to the invention is preferably used for modifying polyesters containing carboxyl groups.

The process according to the invention is distinguished from known processes by the far higher reactivity of the delta$^2$-oxazolines used. At the same time, the hydrolysis stability of polycondensates, such as polyesters and polyamides, is distinctly improved where the long-chain compounds preferably used are incorporated in the polymer molecule. Another advantage is that the delta$^2$-oxazolines used show low volatility and, accordingly, can be reacted with the polymers at the high processing temperatures required without any need for further auxiliary measures. The polymers modified by the process according to the invention show reduced melt viscosities and, in every case, lower adhesion and better slip behavior than the unmodified polymers.

DETAILED DESCRIPTION OF THE INVENTION

The process according to the invention is suitable for polymers varying widely in structure providing they contain carboxyl, amino and/or phenolic hydroxyl groups. The process is of particular interest for polymers in which these substituents occur as terminal groups, more particularly for polyesters and polyamides, but also for polycarbonates. Examples of polymers such as these are, in particular, polyethylene terephthalate, polybutylene terephthalate, polyamide 6, polyamide 6,6, polyamide 9, polyamide 11 and polyamide 12 and also the aromatic polyamides, for example the types synthesized from aromatic diamines and aromatic dicarboxylic acids commercially available as Kevlar® and Nomex®. If pure bis-oxazolines or mixtures of mono- and bis-oxazolines are used for modifying these compounds, not only are the terminal groups modified, an increase in molecular weight is also obtained which, in many cases, is highly desirable because often only low molecular weights are obtained by the polycondensation reaction alone or, alternatively, the polycondensates are depolymerized during processing. Accordingly, the reaction is also of interest for recycling plastic waste consisting of various polycondensation products. In addition to the increase in molecular weight, incompatible polymers are compatibilized by the linkage and can thus be processed to form a polymer blend.

However, compounds in which carboxyl groups, amino groups and/or phenolic hydroxyl groups occur as lateral substituents may also be used as the polymers. Examples of such compounds are polymers and copolymers of acrylic, methacrylic or maleic acid. These polymers can be completely or partly modified by the process according to the invention, the hydrophilic or hydrophobic character of the polymer being adjustable within wide limits depending on the type and quantity of long-chain delta$^2$-oxazoline used. Polymers thus modified may be used, for example, as oil additives, as plastic additives or as polymer surfactants.

The delta$^2$-oxazolines used in accordance with the invention are primarily oxazolines substituted in the 2-position by the alkyl group of a fatty acid containing a total of 8 to 24 carbon atoms or by the phenyl group. Oxazolines such as these can be obtained in various ways, although the processes described in DE 38 24 982, DE 39 14 133 and DE 39 14 159, which start out from carboxylic acids or carboxylic acid esters, have proved to be particularly useful. Accordingly, the disclosure of these patent applications is hereby included in this regard as part of the disclosure of the present application. In individual cases, oxazolines containing relatively long alkyl chains up to about C$_{40}$ may of course also be used. According to DE 39 15 874, delta$^2$-oxazolines of which the alkyl group derives from a hydroxycarboxylic acid and, accordingly, contains a hydroxyl group can be reacted with diisocyanates or polyisocyanates to form bis- or polyoxazolines in which the oxazoline rings are linked by urethane groups. Bis-oxazolines such as these are particularly suitable for the purposes of the process according to the invention. Similar bis-oxazolines which are also suitable are described in hitherto unpublished patent application DE P 41 04 709.3. The bis-oxazolines which can be obtained from the long-chain hydroxyfunctional delta$^2$-oxazolines mentioned above by transesterification with dicarboxylic acid esters and which are described in hitherto unpublished patent application DE P 41 40 333.9 are also suitable for the process according to the invention. Accordingly, the disclosure of the above-cited applications in regard to the bis-oxazolines is hereby specifically included as part of the disclosure of the present application.

Particular advantages are obtained in the modification of polymers, more particularly polyesters, with monofunctional delta$^2$-oxazolines which bear the alkyl/alkenyl group of ricinoleic acid, oleic acid or the soybean oil fatty acid mixture in the 2-position. Where these oxazolines are used, completely colorless and transparent products can be obtained, for example, from polyethylene terephthalate.

The conditions under which the process according to the invention can be carried out may be varied within very wide limits. Thus, the reactants may be reacted in solution or in suspension in suitable solvents or suspending media. However, the possibility of carrying out the reaction in bulk without solvents or suspending media is generally of greater advantage. Reaction temperatures above 100° C. are normally applied, the catalysts typically used for the reaction between oxazoline and carboxylic acids, phenols or amines, as known from the literature, optionally being added for acceleration. Where the reaction is carried out in the absence of a solvent, reaction temperatures in the range from about 150° C. to around 320° C. are preferably applied, reaction temperatures in the range from about 200° C. to about 280° C. being particularly preferred. Under these conditions, reaction times of 2 to 10 minutes and preferably 3 to 5 minutes are often sufficient. The reaction conditions and hence the necessary reaction times are of course highly dependent on the reactivity of the reactants and on the particular conversion required. For the modification of terminal groups in the polymers, 0.1 to 5 parts by weight of oxazoline are normally used to 100 parts by weight of the polymer. This ratio does of course depend to a large extent upon the molecular weights of the reactants and, in individual cases, may even be below or above these values. In order completely to react all functional groups in the polymer, 1 to 2.5 moles and, more particularly, 1.2 to 2 moles of oxazoline groups are normally used per mole of functional group. At all events, the high reactivity of the phenyl oxazoline and the long-chain substituted delta$^2$-oxazolines has an advantageous effect. Typical stirred reactors are suitable for carrying out the reaction in solution or suspension. Screw extruders and similar machines suitable for mixing viscous melts are preferably used where the reaction is carried out in bulk.

EXAMPLES

Examples 1 to 5

In a DSK 42/7 twin-screw extruder (Brabender OHG, Duisburg), which was equipped with a strip die and which had a screw diameter of 41.8 mm and a screw length of seven times that diameter (7D), 100 parts of carboxyl-terminated polyethylene terephthalate (48 equivalents COOH/10$^6$ g) were reacted with the quantities in parts of delta$^2$-oxazoline shown in Table 1 at a temperature of 280° C. adjusted in all three heating zones and at a screw speed of 25 r.p.m. The starting materials were introduced in the form of an intimate mixture of polyester granules and liquid oxazoline. The residence time in the extruder was around 6 minutes. As can be seen from Table 1, the carboxyl content of the polymer was considerably reduced.

TABLE 1

| Example | Delta$^2$-oxazoline | Parts | COOH content [eq/10$^6$ g] |
|---|---|---|---|
| 1 | 2-Heptadecenyloxazoline | 1.0 | 5 |
| 2 | 2-Undecyloxazoline | 0.7 | 7 |
| 3 | 2-Pentadecyloxazoline | 1.2 | 5 |
| 4 | 2-Heptadecenyloxazoline | 1.4 | 4 |
| 5 | 2-Phenyloxazoline | 1.0 | 13 |
| 6 | 3-Soyaalkyloxazoline | 2.0 | 6 |
| 7 | 2-(11-Hydroxyheptadec-8-enyl)-oxazoline (= ricinol-oxazoline) | 1.7 | 6 |
| 8 | Bis-oxazoline of ricinol-oxazoline and 4,4'-diphenyl-methane diisocyanate (according to DE 39 15 874) | 2.4 | 9 |
| 9 | Bis-oxazoline of ricinol-oxazoline and tetramethyl-p-xylene diisocyanate (according to DE 39 15 874) | 2.3 | 10 |
| 10 | No addition | 0.0 | 49 |

Examples 6 to 8

In the same twin-screw extruder as in Example 1, 100 parts of a polybutylene terephthalate ($[\eta]^{35°}_{o-ClC_6H_4OH}$=0.7 dl/g; 64 equivalents COOH per 10$^6$ g) were reacted with the quantities in parts of bis-[2-(12-hydroxy-heptadec-9-enyl)-oxazoline]-terephthalate (according to DE P 41 40 333.9) shown in Table 2. The temperature in all three heating zones of the extruder was 250° C. and the screw speed 30 r.p.m. As can be seen from Table 2, the molecular weight (intrinsic viscosity η) was increased and, at the same time, the percentage content of carboxyl functions was reduced.

TABLE 2

| Example | Parts of bisoxazoline | COOH content [eq./10$^6$ g] | $[\eta]^{35°\,C.}_{o-ClC_6H_4OH}$ [dl/g] |
|---|---|---|---|
| 6 | 0.5 | 26 | 1.4 |
| 7 | 1.0 | 34 | 1.0 |
| 8 | 0.0 | 68 | 0.67 |

We claim:

1. A process for modifying a polymer containing at least one functional group selected from the group consisting of carboxyl groups, amino groups and phenolic hydroxyl groups which comprises: reacting at least one delta$^2$-oxazoline selected from the group consisting of mono-oxazolines substituted in the 2-position by an optionally substituted alkyl or alkenyl group containing 7 to 23 carbon atoms and bis-oxazolines substituted in the 2-position by an optionally substituted alkyl or alkenyl group containing 7 to 23 carbon atoms with the polymer.

2. The process as claimed in claim 1, wherein the polymer comprises plastic waste and the delta$^2$-oxazoline is a bis-oxazoline.

3. The process as claimed in claim 1 wherein the polymer comprises a polyester.

4. The process as claimed in claim 1 wherein the polymer comprises a polyamide.

5. The process as claimed in claim 1 wherein the polymer comprises an aromatic polyamide.

6. The process as claimed in claim 3, wherein the delta$^2$-oxazoline comprises at least one mono-oxazoline bearing a group selected from the group consisting of ricinoleic acid alkyl group, oleic acid alkenyl group and alkyl and alkenyl groups from soybean oil fatty acid in the 2-position.

7. The process of claim 2 wherein the polymer comprises a polyester.

8. The process of claim 7 wherein polyester comprises at least one polyester selected from the group consisting of polyethylene terephthalate and polybutylene terephthalate.

9. The process of claim 3 wherein the polyester comprises at least one polyester selected from the group consisting of polyethylene terephthalate and polybutylene terephthalate.

10. The process of claim 2 wherein the polymer comprises a polyamide.

11. The process of claim 10 wherein the polyamide comprises at least one polyamide selected from the group consisting of polyamide 6 and polyamide 6,6.

12. The process of claim 4 wherein the polyamide comprises at least one polyamide selected from the group consisting polyamide 6 and polyamide 6,6.

13. The process of claim 4 wherein the polyamide is formed from aromatic diamines and aromatic dicarboxylic acids.

14. The process of claim 10 wherein the polyamide is formed from aromatic diamines and aromatic dicarboxylic acids.

15. The process of claim 7 wherein the delta$^2$-oxazoline comprises at least one mono-oxazoline bearing a group selected from the group consisting of ricinoleic acid alkyl group, oleic acid akenyl group and alkyl and alkenyl groups from soybean oil fatty acid in the 2-position.

16. The process of claim 8 wherein the delta$^2$-oxazoline comprises at least one mono-oxazoline bearing a group selected from the group consisting of ricinoleic acid alkyl group, oleic acid akenyl group and allyl and alkenyl groups from soybean oil fatty acid in the 2-position.

17. The process of claim 9 wherein the delta$^2$-oxazoline comprises at least one mono-oxazoline bearing a group selected from the group consisting of ricinoleic acid alkyl group, oleic acid akenyl group and alkyl and alkenyl groups from soybean oil fatty acid in the 2-position.

18. A process for modifying a polymer containing at least one functional group selected from the group consisting of carboxy groups, amine groups, and phenolic hydroxy groups which comprises reacting at least one delta$^2$-oxazoline selected from the group consisting of mono-oxazoline bearing a ricinoleic alkenyl group, mono-oxazoline bearing an oleic acid alkenyl group, and soybean oil fatty acid alkyl and alkenyl groups in the 2-position.

19. The process of claim 18 wherein the polymer comprises a polyester.

20. The process of claim 19 wherein the polyester comprises at least one polyester selected from the group consisting of polyethylene terephthalate and polybutylene terephthalate.

* * * * *